United States Patent
Inagaki et al.

(10) Patent No.: US 11,893,806 B2
(45) Date of Patent: Feb. 6, 2024

(54) LOOKING AWAY DETERMINATION DEVICE, LOOKING AWAY DETERMINATION SYSTEM, LOOKING AWAY DETERMINATION METHOD, AND STORAGE MEDIUM

(71) Applicant: NEC CORPORATION, Tokyo (JP)

(72) Inventors: Kazuki Inagaki, Tokyo (JP); Nana Sakuma, Tokyo (JP)

(73) Assignee: NEC CORPORATION, Tokyo (JP)

( * ) Notice: Subject to any disclaimer, the term of this patent is extended or adjusted under 35 U.S.C. 154(b) by 176 days.

(21) Appl. No.: 17/040,789

(22) PCT Filed: Mar. 1, 2019

(86) PCT No.: PCT/JP2019/008088
§ 371 (c)(1),
(2) Date: Dec. 7, 2020

(87) PCT Pub. No.: WO2019/187979
PCT Pub. Date: Oct. 3, 2019

(65) Prior Publication Data
US 2021/0081690 A1    Mar. 18, 2021

(30) Foreign Application Priority Data
Mar. 27, 2018  (JP) .................................. 2018-059161

(51) Int. Cl.
*G06V 20/59*  (2022.01)
*G06T 7/00*   (2017.01)
(Continued)

(52) U.S. Cl.
CPC ............ *G06V 20/597* (2022.01); *B60W 40/09* (2013.01); *G06T 7/97* (2017.01); *G06V 40/161* (2022.01);
(Continued)

(58) Field of Classification Search
CPC ....... G06V 20/597; G06V 40/161; G06T 7/97
See application file for complete search history.

(56) References Cited

U.S. PATENT DOCUMENTS 10,531,294 B2 *  1/2020  Haley ................. H04W 12/069
11,360,107 B1 *  6/2022  Young ..................... C12Q 3/00
(Continued)

FOREIGN PATENT DOCUMENTS

JP    2005-108033 A    4/2005
JP    2006-350697 A    12/2006
(Continued)

OTHER PUBLICATIONS

International Search Report for PCT/JP2019/008088 dated Jun. 4, 2019 [PCT/ISA/210].

*Primary Examiner* — Ming Y Hon
(74) *Attorney, Agent, or Firm* — Sughrue Mion, PLLC

(57) ABSTRACT

A looking away determination device includes: a determination unit that determines that a driver is in a looking away state when a proportion of an image in which a face of the driver is not detected with respect to a plurality of images obtained by imaging the driver is equal to or greater than a first predetermined value, the first predetermined value being determined based on driving state information that indicates a state during driving by the driver.

20 Claims, 7 Drawing Sheets

(51) Int. Cl.
*G06V 40/16* (2022.01)
*B60W 40/09* (2012.01)

(52) U.S. Cl.
CPC .......... *B60W 2540/225* (2020.02); *G06T 2207/30201* (2013.01); *G06T 2207/30268* (2013.01)

(56) References Cited

U.S. PATENT DOCUMENTS

| | | | | |
|---|---|---|---|---|
| 11,361,593 | B2* | 6/2022 | Xu | G06V 40/67 |
| 2015/0261387 | A1* | 9/2015 | Petersen | G06F 3/0482 |
| | | | | 715/765 |
| 2015/0309569 | A1* | 10/2015 | Kohlhoff | G06V 40/193 |
| | | | | 382/103 |
| 2015/0360697 | A1* | 12/2015 | Baek | B60W 40/09 |
| | | | | 701/23 |
| 2016/0191995 | A1* | 6/2016 | el Kaliouby | H04N 21/812 |
| | | | | 725/12 |
| 2017/0316274 | A1* | 11/2017 | Noridomi | B60K 28/06 |
| 2018/0014754 | A1* | 1/2018 | Gray | A61B 5/1116 |
| 2018/0126901 | A1* | 5/2018 | Levkova | G06V 20/597 |
| 2018/0330249 | A1* | 11/2018 | Hajiyev | G06Q 30/0242 |
| 2019/0034706 | A1* | 1/2019 | el Kaliouby | G06Q 30/0276 |
| 2019/0080189 | A1* | 3/2019 | Van Os | H04N 5/23222 |
| 2019/0095695 | A1* | 3/2019 | Iwanami | G06V 40/16 |
| 2019/0135295 | A1* | 5/2019 | Sato | G06F 3/013 |
| 2019/0147263 | A1* | 5/2019 | Kuehnle | G07C 5/008 |
| | | | | 340/439 |
| 2019/0147275 | A1* | 5/2019 | Matsuura | B60W 50/14 |
| | | | | 348/148 |
| 2019/0225189 | A1* | 7/2019 | Maeda | B60S 1/023 |
| 2019/0266424 | A1* | 8/2019 | Nishimura | G06V 20/56 |
| 2019/0370579 | A1* | 12/2019 | Sugawara | B60W 50/14 |
| 2019/0371189 | A1* | 12/2019 | Hiraide | G06V 40/172 |
| 2020/0000392 | A1* | 1/2020 | Nashida | G01C 21/3641 |
| 2020/0282984 | A1* | 9/2020 | Mizoguchi | B60W 50/14 |
| 2020/0334477 | A1* | 10/2020 | Aoi | G06V 40/174 |

FOREIGN PATENT DOCUMENTS

| | | |
|---|---|---|
| JP | 2007-072570 A | 3/2007 |
| JP | 2008-146356 A | 6/2008 |
| JP | 2015-127937 A | 7/2015 |
| JP | 2016-027452 A | 2/2016 |
| JP | 2017-217472 A | 12/2017 |
| WO | 2007/105792 A1 | 9/2007 |
| WO | 2016/052507 A1 | 4/2016 |

* cited by examiner

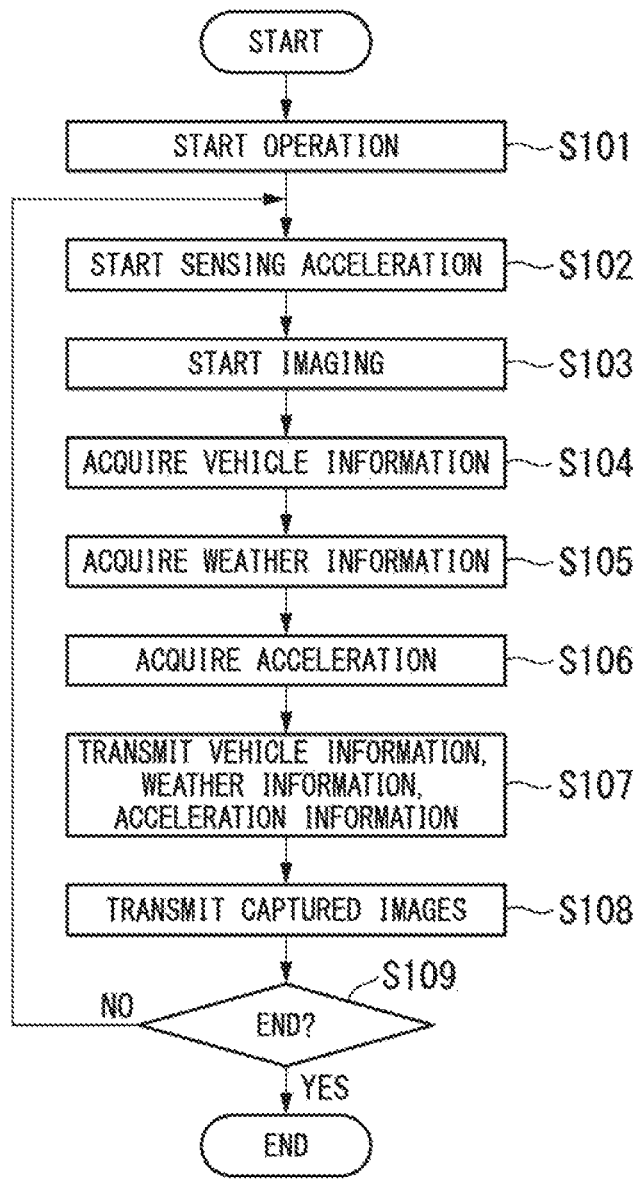

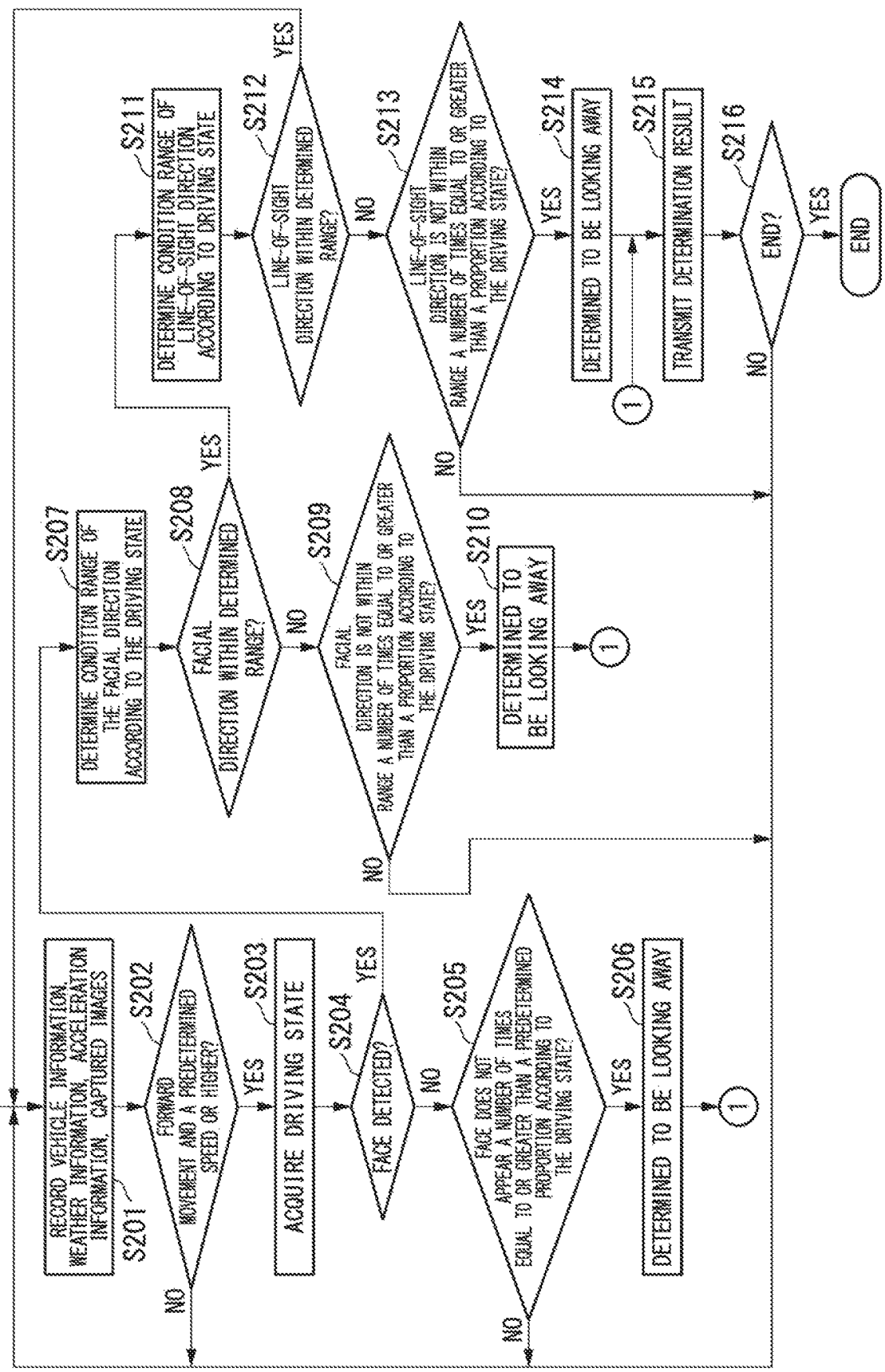

LOOKING AWAY DETERMINATION DEVICE, LOOKING AWAY DETERMINATION SYSTEM, LOOKING AWAY DETERMINATION METHOD, AND STORAGE MEDIUM

CROSS REFERENCE TO RELATED APPLICATIONS

This application is a National Stage of International Application No. PCT/JP2019/008088 filed Mar. 1, 2019, claiming priority based on Japanese Patent Application No. 2018-059161 filed Mar. 27, 2018.

TECHNICAL FIELD

The present invention relates to a looking away determination device, a looking away determination system, a looking away determination method, and a storage medium.

BACKGROUND ART

Patent Document 1 discloses a technique for detecting looking away of a driver operating a moving body such as an automobile.

PRIOR ART DOCUMENTS

Patent Documents

[Patent Document 1] PCT International Publication No. WO 2016/052507

SUMMARY OF THE INVENTION

Problem to be Solved by the Invention

In the above-described technique for determining looking away during driving, looking away detection is performed on the basis of the line-of-sight of the face that appears in a captured image. However, when a face does not appear in the captured image, looking away determination is not performed at all. It is therefore required to appropriately perform looking away determination according to the driving state even if a face does not appear.

An example object of the present invention is to provide a looking away determination device, a looking away determination system, a looking away determination method, and a storage medium that solves the aforementioned issue.

Means for Solving the Problem

According to a first example aspect of the present invention, a looking away determination device includes: a determination unit that determines that a driver is in a looking away state when a proportion of an image in which a face of the driver is not detected with respect to a plurality of images obtained by imaging the driver is equal to or greater than a first predetermined value, the first predetermined value being determined based on driving state information that indicates a state during driving by the driver.

According to a second example aspect of the present invention, a looking away determination system includes an imaging device and a looking away determination device. The looking away determination device includes a determination unit that determines that a driver is in a looking away state when a proportion of an image in which a face of the driver is not detected with respect to a plurality of images obtained by imaging the driver by the imaging device is equal to or greater than a first predetermined value, the first predetermined value being determined based on driving state information that indicates a state during driving by the driver.

According to a third example aspect of the present invention, a looking away determination method includes: determining that a driver is in a looking away state when a proportion of an image in which a face of the driver is not detected with respect to a plurality of images obtained by imaging the driver is equal to or greater than a first predetermined value, the first predetermined value being determined based on driving state information that indicates a state during driving by the driver.

According to a fourth example aspect of the present invention, a storage medium stores a program that causes a computer to execute: determining that a driver is in a looking away state when a proportion of an image in which a face of the driver is not detected with respect to a plurality of images obtained by imaging the driver is equal to or greater than a first predetermined value, the first predetermined value being determined based on driving state information that indicates a state during driving by the driver.

Effect of the Invention

According to an example embodiment of the present invention, when it is determined that a face does not appear based on a captured image, it is possible to determine whether or not there is looking away in accordance with the driving state.

BRIEF DESCRIPTION OF THE DRAWINGS

FIG. 6 is a diagram showing the processing flow of the drive recorder according to the example embodiment of the present invention.

FIG. 7 is a diagram showing the processing flow of the looking away determination device according to the example embodiment of the present invention.

EXAMPLE EMBODIMENT

Hereinbelow, a looking away determination device according to exemplary example embodiments of the present invention will be described with reference to the drawings.

Figure 1:
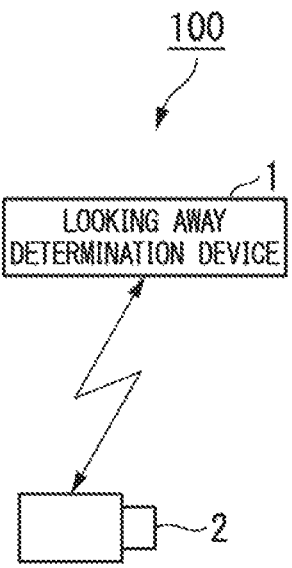
FIG. 1 is a drawing showing a driving state monitoring system according to an example embodiment of the present invention.

FIG. 1 is a diagram showing a driving state monitoring system according to an example embodiment of the present invention.

As shown in FIG. 1, a driving state monitoring system 100 includes a looking away determination device 1 and a drive recorder 2 that is one form of a driving state sensing device. The looking away determination device 1 and the drive recorder 2 are connected via a wireless communication network or a wired communication network. The drive recorder 2 is provided in a vehicle as an example. The looking away determination device 1 is communicatively connected to the drive recorders 2 respectively installed in a plurality of vehicles that are running throughout a city.

Figure 2:
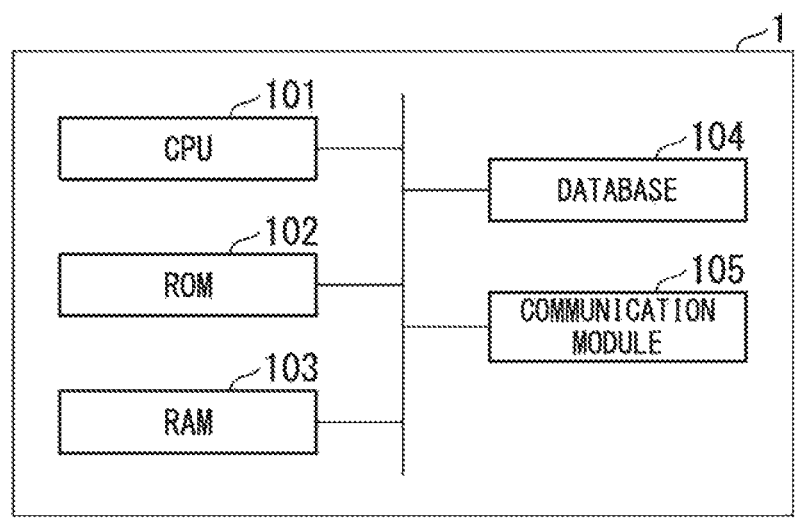
FIG. 2 is a hardware configuration diagram of a looking away determination device according to the example embodiment of the present invention.

FIG. 2 is a hardware configuration diagram of the looking away determination device 1.

As shown in FIG. 2, the looking away determination device 1 is a computer including hardware such as a CPU (Central Processing Unit) 101, a ROM (Read Only Memory) 102, a RAM (Random Access Memory) 103, a database 104, and a communication module 105.

Figure 3:
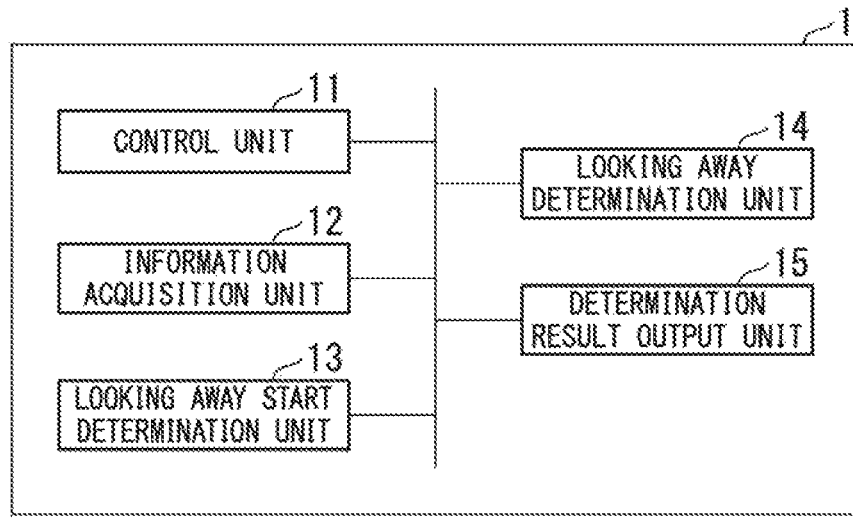
FIG. 3 is a function block diagram of the looking away determination device according to the example embodiment of the present invention.

FIG. 3 is a function block diagram of the looking away determination device 1.

The looking away determination device 1 is activated when the power is turned on, and executes a looking away determination program stored in advance. As a result, the looking away determination device 1 exhibits at least the functions of a control unit 11, an information acquisition unit 12, a looking away start determination unit 13, a looking away determination unit (determination unit) 14, and a determination result output unit 15.

The control unit 11 controls other function units.

The information acquisition unit 12 acquires information transmitted from the drive recorder 2, such as captured images, vehicle information, weather information, and acceleration information.

The looking away start determination unit 13 determines whether to start looking away determination.

The looking away determination unit 14 determines whether or not a face has been detected on the basis of a captured image. The looking away determination unit 14 determines that there is looking away state when a face cannot be detected a predetermined proportion or more per unit time specified on the basis of driving state information acquired during driving. The looking away determination unit 14 determines whether or not the facial direction is within a predetermined condition range on the basis of the captured image, and determines that there is a looking away state when the time during which the facial direction is not within the predetermined condition range determined on the basis of the driving state information is equal to or greater than the predetermined proportion per unit time. In addition, the looking away determination unit 14 determines whether or not the line-of-sight direction is within a predetermined condition range on the basis of the captured image, and determines that there is a looking away state when the time during which the line-of-sight direction is not within the predetermined condition range determined on the basis of the driving state information is equal to or greater than a predetermined proportion per unit time. The looking away determination unit 14 determines the condition range to be a condition range extended in the right direction when the driving state information indicates that the course is changed to the right direction. The looking away determination unit 14 determines the condition range to be a condition range extended in the left direction when the driving state information indicates that the course is changed to the left direction.

That is, the looking away determination unit 14 determines a driver is in a looking away state when the proportion of images in which the face of the driver is not detected with respect to a plurality of images obtained by imaging the driver (during a unit time (predetermined period)) is equal to or greater than a first predetermined value that has been determined on the basis of driving state information indicating the state at the time of driving by the driver. The looking away determination unit 14 determines a driver is in a looking away state when the proportion of images in which the facial direction of the driver is not within a facial direction condition range determined on the basis of the driving state information is equal to or greater than a second predetermined value. The looking away determination unit 14 determines a driver is in a looking away state when the proportion of images in which the line-of-sight direction of the driver is not within a line-of-sight direction condition range determined on the basis of the driving state information is equal to or greater than a third predetermined value. Each unit time (predetermined period) may be the same or different. Moreover, each predetermined value may be the same or different.

The determination result output unit 15 outputs the looking away determination result.

Figure 4:
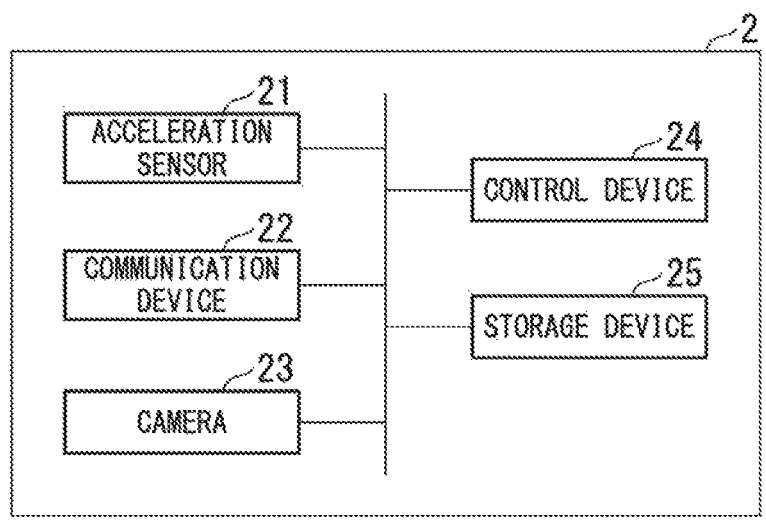
FIG. 4 is diagram showing a hardware configuration of a drive recorder according to the example embodiment of the present invention.

FIG. 4 is a diagram showing a hardware configuration of the drive recorder 2.

The drive recorder 2 includes an acceleration sensor 21, a communication device 22, a camera 23, a control device 24, and a storage device 25. The acceleration sensor 21 detects the acceleration of the vehicle. The communication device 22 is communicatively connected to the looking away determination device 1. The camera 23 captures images of the outside or the inside of the vehicle to generate moving images and still images.

The control device 24 controls each function of the drive recorder 2. The storage device 25 stores moving images, still images, acceleration detected by the acceleration sensor 21, other information obtained from outside the drive recorder 2, and the like. The drive recorder 2 is communicatively connected to the looking away determination device 1 via a base station or the like. The control device 24 of the drive recorder 2 is a computer including a CPU, ROM, RAM and the like.

Figure 5:
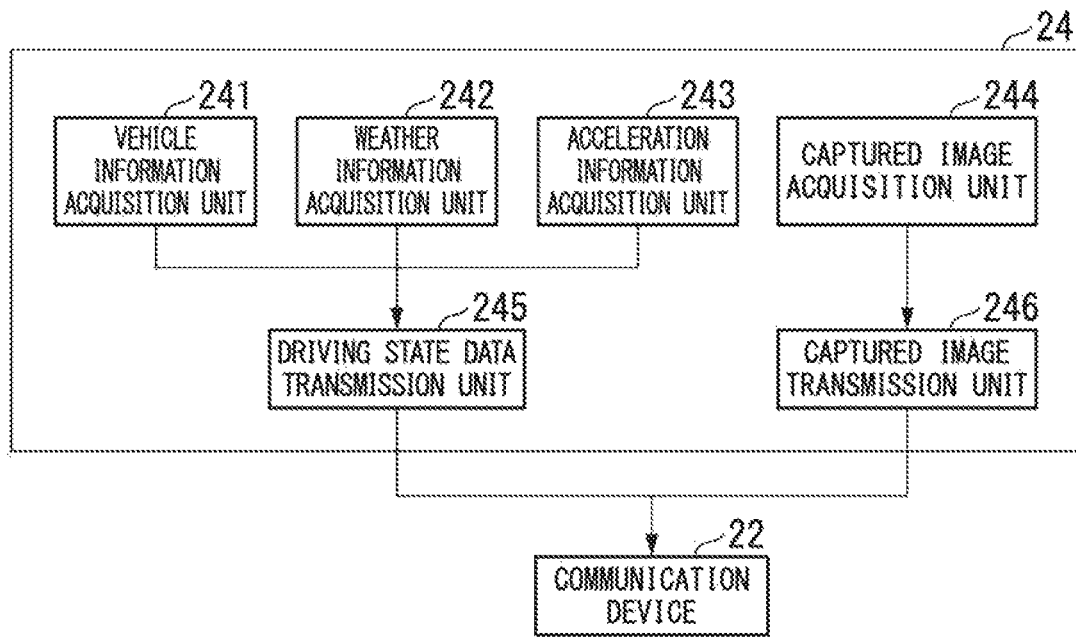
FIG. 5 is a function block diagram of a control device of the drive recorder according to the example embodiment of the present invention.

FIG. 5 is a function block diagram of the control device 24 provided in the drive recorder 2.

The control device 24 executes the control program when the drive recorder starts up. Thereby, the control device 24 is capable of functioning as a vehicle information acquisition unit 241, a weather information acquisition unit 242, an acceleration information acquisition unit 243, a captured image acquisition unit 244, a driving state data transmission unit 245, and a captured image transmission unit 246.

FIG. 6 is a diagram showing the processing flow of the drive recorder 2.

Next, the processing flow of the driving state monitoring system will be explained step by step.

First, the transmission process for the driving state information in the drive recorder 2 will be described.

When the electrical system of the vehicle is activated, the drive recorder 2 starts operation (Step S101). The acceleration sensor 21 of the drive recorder 2 starts sensing acceleration of the vehicle after the drive recorder 2 is started (Step S102). Further, the camera 23 starts imaging the inside of the vehicle and the outside of the vehicle (Step S103). The camera 23 includes a vehicle inside lens and a vehicle outside lens. The camera 23 uses the vehicle inside lens to capture an image of an object in the direction toward the driver's face in the vehicle (a rearward scene in the traveling direction (including the driver's face)). The camera 23 uses the vehicle outside lens to capture an image of an object in the traveling direction outside the vehicle.

Then, during operation of the drive recorder 2, the vehicle information acquisition unit 241 of the control device 24 acquires vehicle information (Step S104). The vehicle information acquired by the vehicle information acquisition unit 241 may be the vehicle speed, steering wheel angle, turn indicator direction, and the like detected by each sensor provided in the vehicle. The weather information acquisition unit 242 acquires weather information (Step S105). The weather information may be acquired from a server device provided in the Meteorological Agency or a weather information provider. Alternatively, the weather information may be information obtained from a sensor (wiper operation detector or raindrop detector) provided in the vehicle. The control device 24 may determine that the weather is rainy when the wiper is operating or when the raindrop detector detects raindrops. The acceleration information acquisition unit 243 acquires acceleration from the acceleration sensor 21 at predetermined time intervals (Step S106). The control device 24 acquires vehicle information, weather information, and acceleration at predetermined intervals.

The driving state data transmission unit 245 instructs the communication device 22 to transmit the vehicle information, the weather information, and the acceleration information to the looking away determination device 1 at predetermined intervals. The communication device 22 transmits the vehicle information, weather information, and acceleration information to the looking away determination device 1 (Step S107). The captured image transmission unit 246 instructs the communication device 22 to transmit captured images to the looking away determination device 1. The communication device 22 transmits the captured images to the looking away determination device 1 (Step S108). The control device 24 determines whether the processing is ended (Step S109), and repeats the processing from Step S102 until the processing is ended. The vehicle information, the weather information, the acceleration information, and the captured images may be provided with the ID of the drive recorder 2, the ID of the driver, and the sensing time (the time when the drive recorder 2 performed image capture). In the aforementioned process, the acceleration and weather information are transmitted. However, when looking away determination is performed based only on the vehicle information, such information need not be transmitted. In addition to vehicle information, other information such as current position information, surrounding map information, route guidance information relating to route guidance of the navigation system, and the like may be transmitted.

FIG. 7 is a diagram showing the processing flow of the looking away determination device 1.

In the looking away determination device 1, on the basis of the ID of the drive recorder 2 or the ID of the driver, the information acquisition unit 12 successively records in the database 104 a set of the corresponding vehicle information, weather information, acceleration information, and captured images in association with each ID (Step S201). Then, the control unit 11 instructs the looking away start determination unit 13 and the looking away determination unit 14 to perform the looking away determination process.

The looking away start determination unit 13 specifies one drive recorder 2 and acquires the sensing time, vehicle information, weather information, acceleration information, and captured images that are recorded in association with that ID. The looking away determination unit 14 determines whether the vehicle speed included in the vehicle information indicates a speed in the forward direction (forward movement) and is a predetermined speed or higher (Step S202). The predetermined speed may be a value such as 20 km/h, for example. The looking away determination unit 14 makes a decision to start the looking away determination when the vehicle speed indicates forward movement and the vehicle is at or above the predetermined speed.

The looking away start determination unit 13 may decide to start the looking away determination by using other information or by additionally using other information. For example, the looking away determination unit 14 may determine whether the acceleration is zero (0) or more, and may decide to start the looking away determination when the acceleration is zero (0) or more. The looking away determination unit 14 may decide to start the looking away determination when the weather information indicates rain. The looking away determination unit 14 may decide to start the looking away determination based on a captured image outside the vehicle. For example, when an object appears in the straight-ahead direction of the captured image, or when a curve appears in the lane in the captured image, a decision to start the looking away determination may be made. When the looking away determination unit 14 makes the decision to start the looking away determination, the looking away determination unit 14 instructs the start. The looking away determination unit 14 repeats the process of determining whether to start the looking away determination at predetermined intervals.

The looking away determination unit 14 acquires driving state information on the basis of the vehicle information (Step S203). The driving state information is information indicating the states during driving, and includes at least the vehicle speed and travel state. The travel state indicates the travel state of the vehicle, and includes forward movement, right turn, left turn, lane change, and curve travel. For example, the looking away determination unit 14 determines that the travel state is forward when the direction indicator (turn indicator) does not indicate a direction and the steering wheel angle is within a range of 10 degrees to the left and right with the straight-ahead direction serving as a standard. The looking away determination unit 14 determines that the travel state is a left turn when the direction indicator is indicating the left direction and the steering wheel angle deviates 10 degrees or more to the left with the straight-ahead direction serving as a standard. The looking away determination unit 14 determines that the travel state is a right turn when the direction indicator is indicating the right direction and the steering wheel angle deviates 10 degrees or more to the right with the straight-ahead direction serving as a standard. The looking away determination unit 14 determines that the travel state is a lane change to the left when the direction indicator indicates the left direction and the steering wheel angle is within a range of 10 degrees to the left and right with the straight-ahead direction serving as a standard. The looking away determination unit 14 determines that the travel state is a lane change to the right when the direction indicator indicates the right direction and the steering wheel angle is within the range of 10 degrees to the right and left with the straight-ahead direction serving as a standard. The looking away determination unit 14 determines that the travel state is left curve travel when the direction indicator does not indicate a direction and the steering wheel angle deviates 10 degrees or more to the left with the straight-ahead direction serving as a standard. The looking away determination unit 14 determines that the travel state is right curve travel when the direction indicator does not indicate a direction and the steering wheel angle deviates 10 degrees or more to the right with the straight-ahead direction serving as a standard.

The looking away determination unit 14 may determine the travel state by using other information or additionally using other information. For example, upon acquiring the position information at the time of driving from the drive recorder 2, the looking away determination unit 14 may determine the travel state on the basis of map information of the position at the time of driving. The looking away determination unit 14 may determine the travel state based on the route guidance information when route guidance information of the navigation system is acquired from the drive recorder 2.

The looking away determination unit 14 receives, from the information acquisition unit 12, a captured image that has already been acquired by the information acquisition unit 12 on the basis of the ID of the drive recorder 2 that is the current processing target. Upon having made the decision to start the looking away determination, the looking away determination unit 14 successively reads the captured images received from the drive recorder 2 at a predetermined interval.

When reading a captured image, the looking away determination unit 14 performs face detection processing to determine whether a face is included in the captured image to an extent allowing the continuation of looking away determination. The looking away determination unit 14 determines whether or not a face can be detected in the newly acquired captured image (Step S204). Upon having detected a face in the newly acquired captured image, the looking away determination unit 14 performs the following facial direction detection processing. When the looking away determination unit 14 cannot detect a face in the newly acquired captured image, the looking away determination unit 14 determines whether a face does not appear a number of times equal to or greater than a predetermined proportion specified on the basis of the driving state information, for images captured at the sensing time up to a predetermined period in the past with the sensing time of the newly acquired captured image serving as a standard (Step S205). The looking away determination unit 14 specifies the predetermined proportion based on the driving state information. For example, when the travel state is right/left turn, lane change, or curve travel, the looking away determination unit 14 lowers the value of the predetermined proportion than when the travel state is forward travel. The looking away determination unit 14 determines the driver to be looking away when a face does not appear a number of times equal to or greater than the predetermined proportion (for example, 50 percent) in captured images acquired during the predetermined period (for example, 1 second) (Step S206). If the number of times in which a face does not appear is less than the predetermined proportion for the captured images acquired during the predetermined period, the looking away determination unit 14 does not determine that the driver is looking away, and returns to the process of determining whether to start the looking away determination.

In the above-described face detection process, when the driver is wearing glasses or a mask, the looking away determination unit 14 may determine that a face does not appear in the captured images to an extent allowing continuation of the looking away determination. In this case, the looking away determination unit 14 may determine to end the process.

Figure 8A:
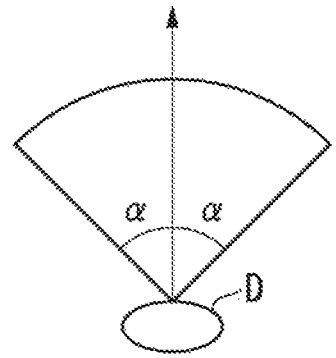
FIG. 8A is a diagram showing an example of the condition range of the facial direction or line-of-sight direction for determining looking away in the looking away determination device according to the example embodiment of the present invention.
Figure 8B:
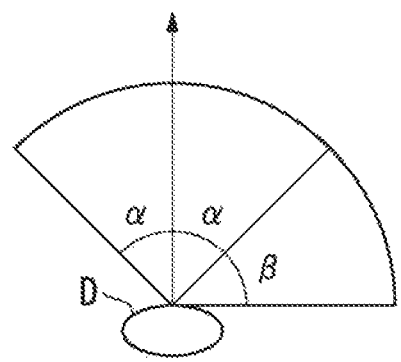
FIG. 8B is a diagram showing an example of the condition range of the facial direction or line-of-sight direction for determining looking away in the looking away determination device according to the example embodiment of the present invention.
Figure 8C:
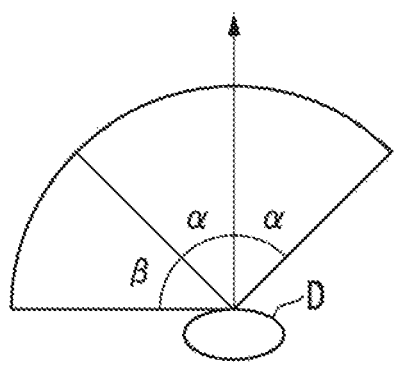
FIG. 8C is a diagram showing an example of the condition range of the facial direction or line-of-sight direction for determining looking away in the looking away determination device according to the example embodiment of the present invention.

In the facial direction detection processing, the looking away determination unit 14 determines a condition range of the facial direction (facial direction condition range) for looking away determination based on the driving state information (Step S207). FIGS. 8A to 8C are diagrams showing examples of condition ranges in the facial direction or the line-of-sight direction for looking away determination in the looking away determination device. For example, when the travel state is forward, the looking away determination unit 14 decides as the condition range a range of a degrees (for example, 10 degrees) to the left and right with the straight-ahead direction serving as a standard, with respect to the driver D (see FIG. 8A). When the travel state indicates a change in course to the right, the looking away determination unit 14 determines the facial direction condition range to be a range extended by β degrees in the right direction with respect to the driver D (straight-ahead direction) more than when the travel state is straight ahead. Examples of the case of the travel state indicating a change in course to the right direction are the travel state being a right turn, a lane change to the right lane, or right curve travel. When the travel state indicates a change in course to the left direction, the looking away determination unit 14 determines the facial direction condition range to be a range extended by β degrees in the left direction with respect to the driver D (straight-ahead direction) more than when the travel state is straight ahead. Examples of the case of the travel state indicating a change in course to the left direction are the travel state being a left turn, a lane change to the left lane, or left curve travel. The β degrees may have different values among the case of turning right or left, the case of changing lanes, and the case of traveling on a curve. The looking away determination unit 14 may change the width of the condition range based on the current vehicle speed. For example, when the speed of the vehicle is low, the driver is more likely to see a wide range. Therefore, the looking away determination unit 14 may further widen the facial direction condition range (width with the straight-ahead direction serving as a standard) by 10 degrees to the left and right.

The looking away determination unit 14 determines whether the facial direction in the newly acquired captured image is within the determined predetermined condition range (Step S208). When the facial direction in the newly acquired captured image is within a predetermined condition range, the looking away determination unit 14 performs the line-of-sight direction detection process. When the facial direction in the newly acquired captured image is not within the predetermined condition range, the looking away determination unit 14 acquires the looking away determination results of images taken up to a predetermined time in the past (for example, 1 second) with the sensing time of the newly acquired captured image serving as a standard. Based on these determination results, the looking away determination unit 14 determines whether the number of times the face is within a predetermined condition range with the straight-ahead direction serving as a standard is equal to or greater than a predetermined proportion (for example, 50 percent) specified based on the driving state information (Step S209). The looking away determination unit 14 determines there is a looking away when the number of times that the face is within the predetermined condition range with the straight-ahead direction serving as a standard is not equal to or greater than the predetermined proportion in the captured images acquired during the predetermined period (Step S210). The looking away determination unit 14 changes the value of the predetermined proportion in accordance with the driving state information in the process of determining whether the number of times the face is within the predetermined condition range with the straight-ahead direction serving as a standard is equal to or greater than the predetermined proportion. For example, when the travel state is right/left turning, lane change, or curve travel, the looking away determination unit 14 lowers the value of the predetermined proportion than when the travel state is forward travel. Moreover, the looking away determination unit 14 decreases the value of the predetermined proportion as the speed decreases. Thereby, as there is a high possibility of visually observing a wide area when the vehicle is running at a low speed, it is not determined that there is a looking away even if visually observing a wide area. Therefore, it is possible to reduce the unnecessary output of extra warning alerts to the driver.

In the line-of-sight direction detection processing, the looking away determination unit 14 determines the condition range of the line-of-sight direction for looking away determination based on the driving state information (Step S211). For example, when the travel state is forward, the looking away determination unit 14 decides as the condition range a range of a degrees (for example, 10 degrees) to the left and right with the straight-ahead direction serving as a standard. When the travel state indicates a change in course to the right direction such as a right turn, a lane change to the right, or travel on a right curve, the looking away determination unit 14 determines a condition range in which the condition range during forward travel is extended by β degrees in the right direction. When the travel state indicates a change in course to the left direction such as a left turn, a lane change to the left, or travel on a left curve, the looking away determination unit 14 determines a condition range in which the condition range during forward travel is extended by β degrees in the left. The β degrees may have different values among the case of turning right or left, the case of changing lanes, and the case of travelling on a curve. The looking away determination unit 14 may change the width of the condition range on the basis of the current vehicle speed. For example, when the speed is low, the looking away determination unit 14 may widen the width based on the straight-ahead direction by 10 degrees to the left and right with the straight-ahead direction serving as a standard since the driver is more likely to be viewing a wide range.

The looking away determination unit 14 determines whether the line-of-sight direction in the newly acquired captured image is within the determined predetermined condition range (line-of-sight direction condition range) (Step S212). When the line-of-sight direction in the newly acquired captured image is within the predetermined range, the looking away determination unit 14 does not determine the driver to be looking away, and returns to the processing for determining whether to start looking away determination. When the line-of-sight direction of the face shown in the newly acquired captured image is not within the predetermined range, the looking away determination unit 14 acquires a determination result for the line-of-sight of faces that appear in images captured up to a predetermined period in the past (for example, 1 second) with the sensing time of the newly acquired captured image serving as a standard. On the basis of those determination results, the looking away determination unit 14 determines whether or not the number of times in which the line-of-sight is within the predetermined condition range with the straight-ahead direction serving as a standard is equal to or greater than a predetermined proportion specified on the basis of the driving state information (Step S213). The looking away determination unit 14 determines the driver to be looking away when the number of times in which the line-of-sight within the predetermined condition range with the straight-ahead direction serving as standard is not equal to or greater than the predetermined proportion (for example, 50 percent) for captured images acquired during the predetermined period (for example, 1 second) (Step S214). The looking away determination unit 14 changes the value of the predetermined proportion in accordance with the driving state information in the process of determining whether the number of times that the line-of-sight is within the predetermined condition range with the straight-ahead direction serving as a standard is equal to or greater than the predetermined proportion. For example, when the travel state is right/left turn, lane change or curve traveling, the looking away determination unit 14 makes the value of the predetermined proportion lower than when the travel state is forward travel. The looking away determination unit 14 decreases the value of the predetermined ratio as the vehicle speed decreases. Here, as described above, when the speed of the vehicle is low, the driver is likely to be viewing a wide area. In such a case, even if the driver views a wide area, the driver will not be judged as looking away. As a result, it is possible to reduce the output of excessive looking-away alerts to the driver.

Upon having determined that looking away is being performed, the looking away determination unit 14 instructs the determination result output unit 15 to output a looking away determination result. The determination result output unit 15 acquires the ID of the drive recorder 2 associated with the data used when a determination is made that looking away is being performed. The determination result output unit 15 acquires the network address that is the transmission destination from the database 104 on the basis of the ID of the drive recorder 2. The network address of the transmission destination is recorded in the database 104 in advance. The determination result output unit 15 transmits information indicating looking away detection to the transmission destination (Step S215). The determination result output unit 15 may record information indicating the looking away detection in the database 104 in association with the ID of the drive recorder 2 or the ID of the driver. The looking away determination unit 14 determines whether to end the process (Step S216). If the process is not ended, the looking away determination device 1 then repeats the same process at predetermined intervals using the processing received from the drive recorder 2.

The drive recorder 2 receives information indicating that looking away of the driver has been detected. Upon receiving the information of looking away detection, the drive recorder 2 performs a process of notifying the driver of the looking away detection, such as issuing an alarm sound. This enables the driver to become aware of the looking away driving.

In the above process, the looking away determination device 1 connected to a communication network as a cloud server performs looking away determination. However, the drive recorder 2 may independently perform the above-described process of looking away determination. That is, the drive recorder 2 may operate as the looking away determination device 1. In this case, the drive recorder 2 may exhibit the same functions as the above-mentioned information acquisition unit 12, the looking away start determination unit 13, the looking away determination unit 14, and the determination result output unit 15. Alternatively, a vehicle-mounted device mounted in the vehicle and connected to the drive recorder 2 may exhibit the same functions as the information acquisition unit 12, the looking away start determination unit 13, the looking away determination unit 14, and the determination result output unit 15. In this case, the vehicle-mounted device operates as the looking away determination device 1.

According to the above-mentioned process, even if the facial direction or the line-of-sight direction cannot be detected, it is possible to detect looking away of the driver depending on whether or not the face can be detected.

In addition, the above-described process outputs an alert when the facial direction or line-of-sight direction has shifted by a predetermined proportion in a predetermined period, without performing an alert indicating that looking away has been detected just by a slight deviation in the facial direction or line-of-sight direction. Thereby, it is possible to reduce the output of unnecessary looking away detection alerts to the driver.

In addition, the above-described looking away determination device 1 avoids detecting the driver as looking away in a state where the line-of-sight direction deviates from the forward direction, in the case of driving at a speed equal to or lower than a predetermined speed, such as driving at a low speed. Thereby, it is possible to reduce the output of unnecessary looking away detection alerts to the driver.

In addition, the above-described looking away determination device 1 performs a process of broadening the range with the straight-ahead direction serving as a standard for the case of determining a possibility of a looking away determination in response to a decrease in the speed of the vehicle. For that reason, it is possible to perform looking away determination based on an appropriate range of the facial direction or the line-of-sight direction according to the speed.

In addition, according to the above-described processing, in the process of determining whether the number of times in which the line-of-sight is within the predetermined range with the straight-ahead direction serving as a standard is equal to or greater than a predetermined proportion, the looking away determination device 1 lowers the value of that predetermined proportion as the speed decreases. Thereby, it is possible to perform looking away determination based on an appropriate range of the facial direction or the line-of-sight direction according to the speed.

Further, according to the above-described processing, in the process of determining whether the number of times a face has been detected is equal to or greater than a predetermined proportion, the looking away determination device 1 specifies a value of the predetermined proportion on the basis of the driving state information. This enables determination of whether the driver is looking away not only when traveling forward, but also when turning right or left, when changing lanes, or when traveling in a curving lane. Therefore, it is possible to make an appropriate looking away determination according to the driving state.

Further, according to the above-described processing, in the process of determining whether the facial direction or the line-of-sight direction is within a predetermined condition range with the straight-ahead direction as a reference, the looking away determination device 1 determines that predetermined condition range based on the driving state information. Thereby, it is possible to perform the looking away determination based on an appropriate range of the facial direction and line-of-sight direction according to the driving state.

Further, according to the above-described processing, in the process of determining whether the number of times that the facial direction or the line-of-sight direction is within the predetermined condition range with the straight-ahead direction serving as a standard is equal to or greater than a predetermined proportion, the looking away determination device 1 determines the predetermined proportion on the basis of the driving state information. Thereby, it is possible to perform the looking away determination based on an appropriate range of the facial direction and the line-of-sight direction according to the driving state.

In the above example embodiment, the looking away determination device 1 extends the condition range of the facial direction and the line-of-sight direction in the right direction when changing the course to the right direction, and in the left direction when changing the course to the left direction, but is not limited to such a configuration. The entire condition range (center of the condition range) may be shifted to the left or right direction. For example, the looking away determination device 1 may shift the condition range in the right direction when changing the course to the right direction, and may shift the condition range in the left direction when changing the course to the left direction.

Figure 9:
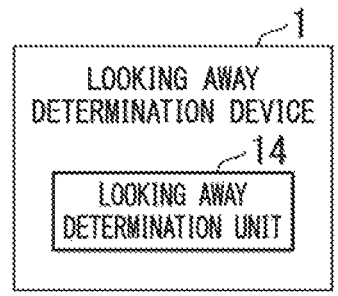
FIG. 9 is a drawing showing a configuration of a looking away determination device according to another example embodiment of the present invention.

FIG. 9 is a diagram showing a configuration of a looking away determination device according to another example embodiment of the present invention.

The looking away determination device 1 only need to include at least the looking away determination unit 14. The looking away determination unit 14 determines whether or not a face could be detected on the basis of the captured images. The looking away determination unit 14 makes a determination of a looking away state when a face cannot be detected a predetermined proportion or more per unit time specified based on the driving state information acquired during driving.

The looking away determination device 1 and the drive recorder 2 described above have a computer system inside. The process of each process described above is stored in a computer-readable recording medium in the form of a program, with the above process being performed by the computer reading and executing the program. Here, the computer-readable recording medium refers to a magnetic disk, a magneto-optical disk, a CD-ROM, a DVD-ROM, a semiconductor memory, or the like. Further, the computer program may be distributed to a computer via a communication line, and the computer that receives the distribution may execute the program.

Also, the above program may be for realizing some of the functions described above. Further, the program may be a so-called differential file (differential program) that can realize the functions described above in combination with a program already recorded in the computer system.

While a number of example embodiments of the present invention have been described above, it should be understood that they have been presented by way of example, and do not limit the scope of the invention. It will be understood that various additions, omissions, substitutions and modifications may be made to these example embodiments within the scope not departing from the spirit of the invention.

The whole or part of the exemplary example embodiments disclosed above can be described as, but not limited to, the following supplementary notes.

(Supplementary Note 1)

A looking away determination device comprising:
  a determination unit that determines that a driver is in a looking away state when a proportion of an image in which a face of the driver is not detected with respect to a plurality of images obtained by imaging the driver is equal to or greater than a first predetermined value, the first predetermined value being determined based on driving state information that indicates a state during driving by the driver.

(Supplementary Note 2)

The looking away determination device according to supplementary note 1, wherein the determination unit determines that the driver is in the looking away state when a proportion of an image in which a facial direction of the driver is not within a facial direction condition range with respect to the plurality of images obtained by imaging the driver is equal to or greater than a second predetermined value, the facial direction condition range being determined based on the driving state information.

(Supplementary Note 3)

The looking away determination device according to supplementary note 2, wherein the determination unit determines that the driver is in the looking away state when a proportion of an image in which a line-of-sight direction of the driver is not within a line-of-sight direction condition range with respect to the plurality of images obtained by imaging the driver is equal to or greater than a third predetermined value, the line-of-sight direction condition range being determined based on the driving state information.

(Supplementary Note 4)

The looking away determination device according to supplementary note 2 or supplementary note 3, wherein the determination unit extends the facial direction condition range in a right direction when the driving state information indicates that a course of a vehicle driven by the driver is changed to the right direction.

(Supplementary Note 5)

The looking away determination device according to supplementary note 3 or supplementary note 4, wherein the determination unit extends the line-of-sight direction condition range to a right direction when the driving state information indicates that a course of a vehicle driven by the driver is changed in the right direction.

(Supplementary Note 6)

The looking away determination device according to supplementary note 2 or supplementary note 3, wherein the determination unit extends the facial direction condition range in a left direction when the driving state information indicates that a course of a vehicle driven by the driver is changed to the left direction.

(Supplementary Note 7)

The looking away determination device according to supplementary note 3 or supplementary note 6, wherein the determination unit extends the line-of-sight direction condition range in a left direction when the driving state information indicates that a course of a vehicle driven by the driver is changed to the left direction.

(Supplementary Note 8)

The looking away determination device according to supplementary note 1, wherein the determination unit determines the first predetermined value based on the driving state information.

(Supplementary Note 9)

The looking away determination device according to supplementary note 2, wherein the determination unit determines the facial direction condition range based on the driving state information.

(Supplementary Note 10)

The looking away determination device according to supplementary note 3, wherein the determination unit determines the line-of-sight direction condition range based on the driving state information.

(Supplementary Note 11)

The looking away determination device according to supplementary note 1, wherein the determination unit detects the face of the driver from each of the plurality of images.

(Supplementary Note 12)

The looking away determination device according to supplementary note 1,
  wherein the determination unit detects the face of the driver from a first image captured last among the plurality of images, and
  the determination unit detects the face of the driver from each of the plurality of images when the face of the driver is not detected from the first image.

(Supplementary Note 13)

The looking away determination device according to supplementary note 12,
  wherein the determination unit detects a facial direction of the driver from the first image when the face of the driver is detected from the first image, and
  the determination unit determines whether the detected facial direction is within a facial direction condition range.

(Supplementary Note 14)

The looking away determination device according to supplementary note 13,
  wherein when the detected facial direction is not determined to be within the facial direction condition range, the determination unit detects the facial direction of the driver from each of the plurality of images, and
  the determination unit determines that the driver is in the looking away state when the proportion of an image in which the facial direction of the driver is not within the facial direction condition range with respect to the plurality of images is equal to or greater than a second predetermined value.

(Supplementary Note 15)

The looking away determination device according to supplementary note 13 or supplementary note 14,
  wherein the determination unit detects a line-of-sight direction of the driver from the first image when the detected facial direction is determined to be within the facial direction condition range, and
  the determination unit determines whether the detected line-of-sight direction is within a line-of-sight direction condition range.

(Supplementary Note 16)

The looking away determination device according to supplementary note 15,
  wherein when the detected line-of-sight direction is not determined to be within the line-of-sight direction condition range, the determination unit detects the line-of-sight direction of the driver from each of the plurality of images, and the determination unit determines that the driver is in the looking away state when a proportion of an image in which the line-of-sight direction of the driver is not within the line-of-sight direction condition range with respect to the plurality of images is equal to or greater than a third predetermined value.

(Supplementary Note 17)

A looking away determination system comprising an imaging device and a looking away determination device, wherein the looking away determination device comprises a determination unit that determines that a driver is in a looking away state when a proportion of an image in which a face of the driver is not detected with respect to a plurality of images obtained by imaging the driver by the imaging device is equal to or greater than a first predetermined value, the first predetermined value being determined based on driving state information that indicates a state during driving by the driver.

(Supplementary Note 18)

A looking away determination method comprising:

determining that a driver is in a looking away state when a proportion of an image in which a face of the driver is not detected with respect to a plurality of images obtained by imaging the driver is equal to or greater than a first predetermined value, the first predetermined value being determined based on driving state information that indicates a state during driving by the driver.

(Supplementary Note 19)

A storage medium that stores a program that causes a computer to execute:

determining that a driver is in a looking away state when a proportion of an image in which a face of the driver is not detected with respect to a plurality of images obtained by imaging the driver is equal to or greater than a first predetermined value, the first predetermined value being determined based on driving state information that indicates a state during driving by the driver.

This application is based upon and claims the benefit of priority from Japanese Patent Application No. 2018-59161, filed Mar. 27, 2018, the disclosure of which is incorporated herein in its entirety.

INDUSTRIAL APPLICABILITY

The present invention may be applied to a looking away determination device, a looking away determination system, a looking away determination method, and a storage medium.

REFERENCE SYMBOLS

1: Looking away determination device
2: Drive recorder
11: Control unit
12: Information acquisition unit
13: Looking away start determination unit
14: Looking away determination unit
15: Determination result output unit
21: Acceleration sensor
23: Camera
24: Control device
241: Vehicle information acquisition unit
242: Weather information acquisition unit
223: Acceleration information acquisition unit
244: Captured image acquisition unit
245: Driving state data transmission unit
246: Captured image transmission unit

The invention claimed is:

1. A looking away determination device comprising:
a memory configured to store instructions; and
a processor configured to execute the instructions to:
determine, when a face of a driver is not detected from a first image captured last among a plurality of images, that the driver is in a looking away state when a number of images in which the face of the driver does not appear with respect to a plurality of images obtained by imaging the driver is equal to or greater than a first value, the first value being determined based on driving state information that indicates a state during driving by the drivel;
detect a facial direction of the driver from the first image when the face of the driver is detected from the first image;
determine whether the detected facial direction is within a facial direction condition range;
detect a line-of-sight direction of the driver from the first image when the detected facial direction is determined to be within the facial direction condition range; and
determine whether the detected line-of-sight direction is within a line-of-sight direction condition range.

2. The looking away determination device according to claim 1, wherein the processor is configured to execute the instructions to: determine the first value based on the driving state information.

3. The looking away determination device according to claim 1, wherein the processor is configured to execute the instructions to: try to detect the face of the driver from each of the plurality of images.

4. The looking away determination device according to claim 1,
wherein the processor is configured to execute the instructions to:
try to detect the face of the driver from the first image; and
try to detect the face of the driver from each of the plurality of images when the face of the driver is not detected from the first image.

5. The looking away determination device according to claim 1,
wherein the processor is configured to execute the instructions to:
detect, when the detected facial direction is not determined to be within the facial direction condition range, the facial direction of the driver from each of the plurality of images; and
determine that the driver is in the looking away state when a number of images in which the facial direction of the driver is not within the facial direction condition range with respect to the plurality of images is equal to or greater than a second value.

6. The looking away determination device according to claim 1,
wherein the processor is configured to execute the instructions to:
detect, when the detected line-of-sight direction is not determined to be within the line-of-sight direction condition range, the line-of-sight direction of the driver from each of the plurality of images obtained by imaging the driver during a predetermined period; and determine that the driver is in the looking away state when a number of the images in which the line-of-sight direction of the driver is not within the line-of-sight direction condition range with respect to the plurality of images is equal to or greater than a third value.

7. A looking away determination system comprising:
the looking away determination device according to claim 1; and
a camera that obtains the plurality of images by imaging.

8. The looking away determination device according to claim 1, wherein the driving state information includes at least one of a steering wheel angle or a turn indicator direction.

9. The looking away determination device according to claim 1, wherein the driving state information includes at least a steering wheel angle.

10. The looking away determination device according to claim 1, wherein the driving state information includes at least a turn indicator direction.

11. The looking away determination device according to claim 1, wherein the driving state information includes at least a speed of the vehicle.

12. The looking away determination device according to claim 1, wherein the driving state information includes at least a travel state of the vehicle, and wherein the travel state includes at least forward movement, right turn, left turn, and lane change.

13. The looking away determination device according to claim 1, wherein the driving state information includes at least a travel state of the vehicle, and wherein the travel state includes at least forward movement, right turn, left turn, and curve travel.

14. The looking away determination device according to claim 1, wherein the first value is a proportion of a predetermined number of images to a total number of the plurality of images.

15. The looking away determination device according to claim 1, wherein the processor is configured to execute the instructions to:
determine that the driver is in a looking away state when the face of the driver does not appear the number of images among the plurality of images obtained by imaging the driver during a predetermined period with respect to a total number of the plurality of images is equal to or greater than the first value.

16. The looking away determination device according to claim 1, wherein the first value is lower when the driving state information indicates at least one of right/left turn, lane change, or curve travel.

17. The looking away determination device according to claim 1, wherein the processor is configured to execute the instructions to:
determine that the driver is in the looking away state when a number of images in which the facial direction of the driver is not within the facial direction condition range with respect to the plurality of images is equal to or greater than a second value, when the face of the driver is detected from the first image.

18. The looking away determination device according to claim 1, wherein the processor is configured to execute the instructions to:

determine whether or not the facial direction is within the facial direction condition range based on a traveling direction, when the face of the driver is detected from the first image;
determine whether the line-of-sight direction is within the line-of-sight direction condition range based on the traveling direction, when the facial direction is determined to be within the facial direction condition range;
determine that the driver is in the looking away state, when a time during which the facial direction is not within the facial direction condition range determined based on the driving state information is more than a first proportion per unit time; and
determine that the driver is in the looking away state, when a time during which the line-of-sight direction is not within the line-of-sight direction condition range determined based on the driving state information is more than a second proportion per unit time.

19. A looking away determination method comprising:
determining, when a face of a driver is not detected from a first image captured last among a plurality of images, that the driver is in a looking away state when a number of images in which the face of the driver does not appear with respect to a plurality of images obtained by imaging the driver is equal to or greater than a first value, the first value being determined based on driving state information that indicates a state during driving by the drivel;
detecting a facial direction of the driver from the first image when the face of the driver is detected from the first image;
determining whether the detected facial direction is within a facial direction condition range;
detecting a line-of-sight direction of the driver from the first image when the detected facial direction is determined to be within the facial direction condition range; and
determining whether the detected line-of-sight direction is within a line-of-sight direction condition range.

20. A non-transitory computer-readable storage medium that stores a program that causes a computer to execute:
determining, when a face of a driver is not detected from a first image captured last among a plurality of images, that the driver is in a looking away state when a number of images in which the face of the driver does not appear with respect to a plurality of images obtained by imaging the driver is equal to or greater than a first value, the first value being determined based on driving state information that indicates a state during driving by the drive;
detecting a facial direction of the driver from the first image when the face of the driver is detected from the first image;
determining whether the detected facial direction is within a facial direction condition range;
detecting a line-of-sight direction of the driver from the first image when the detected facial direction is determined to be within the facial direction condition range; and
determining whether the detected line-of-sight direction is within a line-of-sight direction condition range.

* * * * *